United States Patent Office 3,128,249
Patented Apr. 7, 1964

3,128,249
METHOD FOR CLARIFYING WATER
David J. Pye, Concord, and George F. Schurz, Antioch, Calif., assignors to The Dow Chemical Company, Midland, Mich., a corporation of Delaware
No Drawing. Filed July 18, 1955, Ser. No. 522,864
5 Claims. (Cl. 210—53)

This invention relates to the clarification of water and is particularly directed to a method for facilitating the reduction of turbidity in water supplies.

In the treatment of water for industrial or municipal use, particularly where surface waters such as those from lakes and rivers are used, it is frequently necessary to remove finely divided solids such as silt and clay in order to provide water suitably clarified for the desired use. Similar problems are encountered where it is desired to clarify for reuse industrial process waters contaminated with finely divided solids. Removal of such finely divided solids by filtration alone has proved impractical in large scale operations. In the past, it has been common practice to employ polyvalent metal salts such as aluminum sulfate, iron chloride and the like to facilitate removal of suspended solids by sedimentation or filtration. However, such coagulating agents require close control of the pH of the water and may convert temporary hardness due to bicarbonates of calcium and magnesium into less desirable permanent hardness.

In U.S. Patent 2,362,022, there is described a method for clarifying water by employing a slurry of sodium bentonite to accomplish sedimentation of finely divided suspended solids. However, in this method a considerable quantity of bentonite and fine floc remain suspended in the water after the primary sedimentation and a second stage of sedimentation employing a polyvalent metal salt is necessary. This method has the obvious disadvantage of requiring the extra feeding, mixing and settling equipment to accomplish the two successive stages of sedimentation.

It is an object of the present invention to provide a method for clarifying water. It is a further object of the invention to provide an improved method for employing bentonite as a flocculation aid whereby only a single stage of sedimentation is required. Other objects will become apparent from the following specification and claims.

According to the present invention, it has been discovered that the introduction of bentonite and a small amount of an acrylamide polymer into water containing undesired suspended solids accomplishes the formation of a readily settleable floc comprising the bentonite and the suspended solids. Such flocs are easily separated from the water by conventional treatments such as sedimentation or filtration to produce clarified water. It is among the advantages of the invention that the described clarification is accomplished with a single sedimentation step. It is a further advantage that the flocculation of the bentonite and suspended solids is accomplished by very small amounts of the acrylamide polymer. Another advantage of the invention resides in the fact that the flocculation may be brought about in raw waters having a wide range of pH without appreciably altering the pH and without undesirable alteration of the hardness of the water.

The acrylamide polymers effective in the invention are water soluble and characterized by a minimum of cross linking between polymer chains. Effective polymers are those having viscosities of at least about 2 centipoises for an aqueous 0.5 percent by weight solution thereof in distilled water adjusted to a pH of 3 to 3.5 and at a temperature of 25° C. as determined with an Ostwald viscosimeter. The term "viscosity" as employed in the following specification and claims refers to the viscosity of an aqueous 0.5 percent by weight solution under the conditions set forth above. The term "acrylamide polymer" includes both the homopolymer of acrylamide and copolymers of acrylamide with up to about 15 mole percent of other suitable monomers such as acrylic and methacrylic acids and their lower alkyl esters, acrylonitrile, methacrylonitrile, methacrylamide, vinyl alkyl ethers, styrene, vinyl chloride, vinylidene chloride and the like, each such copolymer being characterized by water solubility, low degree of cross linking and viscosity properties as set forth above.

Suitable bentonites to be employed in the practice of the invention include the typical bentonites from the Wyoming and South Dakota deposits and also other clays consisting preponderantly of montmorillonite structures as, for example, hectorite and the like. In general the alkaline bentonites having the property of swelling in water are preferred.

In carrying out the invention the bentonite is added to the water to be clarified in the form of an aqueous slurry. Any suitable concentration of bentonite may be employed in such treating slurries, however, it is convenient to use a slurry containing from about 1 to 5 percent by weight of bentonite since lower concentrations may be uneconomical and higher concentrations tend to form a slurry too viscous for ease of handling. In the preparation of such slurries, it is desirable to assure that hydration of the bentonite is complete before employing the slurry for water clarification. With Wyoming-type bentonite hydration appears to proceed rapidly and the slurry is ready for use after a few minutes of stirring to disperse the bentonite in cold water. With certain other bentonites, as for example, the hectorite-type material produced near Hector, California, it is desirable to heat the slurry at temperatures of from about 70° to 95° C. with occasional stirring for several hours, prior to using.

The slurry of bentonite is thoroughly mixed with the water to be clarified with vigorous agitation for a period of about one minute and thereafter the acrylamide polymer is added. Such procedure, involving dispersion of the bentonite in the water before addition of the acrylamide polymer, is a preferred mode of operation in batch treatments and in some conventional water-clarification apparatus although satisfactory flocculation and clarification have been obtained when the order of addition of bentonite and acrylamide polymer were reversed. Alternatively, in flocculation and sedimentation apparatus wherein the incoming stream of raw water is contacted with settled solids from previously treated water, good results have been obtained when introducing the bentonite slurry and acrylamide polymer solution through separate pipes or other injection means into the incoming raw water stream where the latter is flowing rapidly. In this mode of operation, no special equipment for dispersing the bentonite is necessary and the degree of mixing accomplished by the water movement suffices. In any case, it is preferred that the bentonite and acrylamide polymer be contacted after the bentonite has been added to the mass of water to be clarified. The acrylamide polymer may be added to the water in any suitable fashion provided that solution of the polymer in the water and thorough mixing theroef with the water is accomplished rapidly. In general, it is preferred to add to the water an aqueous solution of the polymer. The concentration of acrylamide polymer in the aqueous solutions employed in the invention is not particularly critical provided such solution is sufficiently fluid for ease of handling and to allow for the rapid and thorough mixing of the polymer solution with the mass of water to be clarified. However, very dilute solutions have the advantage of being readily introduced in conventional chemical feeders while maintaining accurate dosage at the low levels employed in the invention. In practice it has been found advantageous to employ treating solutions containing not more than about 0.5 percent by weight of acrylamide polymer and, in general, treating solutions containing from about 0.01 to about 0.1 percent by weight of polymer are preferred.

In practice, satisfactory flocculation of suspended solids and bentonite by the acrylamide polymer has been obtained in the presence of moderate amounts of polyvalent ions such as calcium and magnesium ions as normally encountered in most natural water supplies. With this in mind, it is desirable that clarification in accordance with the present invention be carried out prior to any softening operations which remove the aforesaid ions from solution although the latter can be intentionally introduced if desired. The desired concentration of polyvalent ions will vary depending upon the content of the other ionized substances in the water and the particular bentonite employed. Good flocculation and sedimentation have been obtained employing the present method on water supplies containing about 100 or more parts per million hardness, calculated as calcium carbonate.

The amounts of bentonite and acrylamide polymer to be employed will vary depending upon such factors as the amount and type of solids suspended in the raw water supply and the degree of clarification and rapidity of sedimentation desired. In general, bentonite is employed in the amount of from about 10 to 500 parts by weight per million parts by weight of raw water and the acrylamide polymer is employed in the amount of from about .05 to 2 or more parts by weight per million parts by weight of water. Within the above range of dosage it has been found advantageous to adjust the concentrations to secure ratios of bentonite to acrylamide polymer of from about 50:1 to 500:1 on a weight basis.

Following the mixing of the bentonite and acrylamide polymer with the water, it is preferred to submit the resulting suspension to mild agitation for a period of about fifteen minutes to accomplish the formation of a large, readily settleable floc. Thereafter agitation is discontinued or the water is drawn off into a non-turbulent zone so that sedimentation can occur.

The following examples illustrate the invention but are not to be construed as limiting the same:

*Example 1*

A bentonite from the deposits near Hector, California, was suspended in and mixed with water to prepare a dispersion containing 5 percent by weight of the bentonite. This dispersion was heated at temperatures of 90°–95° C. for two hours with occasional agitation. Portions of the resulting slurry were added to rived water to provide 50 parts of bentonite per million parts by weight of water. The river water contained suspended solids, mostly difficultly settleable, equivalent to a turbidity of about 300 parts per million of silica on the American Public Health Association scale. During the addition of the bentonite slurry and for one minute thereafter, the water was strongly agitated with a propeller stirrer operating at 900 revolutions per minute.

Thereafter, the treated water was transferred to a vessel equipped with paddle stirrers operating at relatively slow speed and an aqueous 0.04 percent by weight solution of an acrylamide polymer having a viscosity of 9.8 centipoises was added in the amount of 0.5 part by weight of the polymer per million parts of water. Gentle stirring was continued for a period of 15 minutes, after which time stirring was stopped and the suspended solids allowed to settle. After two minutes settling time, a sample of the water was withdrawn from two inches below the surface and the turbidity thereof determined in a photo-electric colorimeter. The colorimeter reading was converted to parts per million of silica turbidity employing a calibration curve derived by comparison with a Hellige turbidimeter [A. A. Hirsch, Water and Sewage Works, 93, 84–5 (1946)] adjusted to the turbidity scale of the American Public Health Association (Standard Methods for the Examinition of Water and Sewage, ninth edition, American Public Health Association, New York, 1946). The sample of treated water had a turbidity of 7 parts per million.

*Example 2*

A Wyoming-type bentonite from a deposit near Belleforche, South Dakota, was dispersed in water to prepare a slurry containing 2 percent of the bentonite. This slurry was employed for the clarification of turbid river water following the method of Example 1. The raw river water had a turbidity of about 200 parts per million silica on the American Public Health Association scale. The bentonite was employed in the amount of 25 parts by weight per million parts of water and the acrylamide polymer was introduced as an aqueous 0.04 percent by weight solution at the rate of 0.2 part by weight of polymer per million parts of water. The acrylamide polymer used was characterized by a viscosity of 9.0 centipoises. Successive determinations under the above conditions produced water with a residual turbidity of from 5–7 parts per million of silica on the Americal Public Health Association scale.

*Example 3*

The input line into the bottom of a cylindrical settling vessel was fitted with connecting lines for injecting an aqueous 2 percent by weight slurry of Wyoming-type bentonite and the acrylamide polymer treating solution of Example 2. Raw river water similar to that of Example 2 was pumped through the input line into the settling vessel and bentonite and acrylamide polymer injected thereinto at rates of 25 parts by weight and 0.3 part by weight, respectively, per million parts by weight of water. The lower portion of the settling vessel was equipped with baffles and a paddle agitator operating at low speed to provide for contacting the entering treated water with any settled flocculated solids in the system. The water was pumped into the vessel at a rate to give about 1 inch rise per minute. Water flowing over the top of the settling vessel was found to contain a residual turbidity of 6 parts per million determined as in the preceding examples. After about 21 hours of continuous operation in the above fashion, a dense layer of flocculated solids had built up in the lower section of the sedimentation vessel and the overflow had a turbidity of only 3 parts per million of silica.

*Example 4*

Following the procedure of Example 1, turbid water, having a turbidity equivalent to about 25 parts per million of silica and containing 120 parts per million hardness calculated as $CaCO_3$, was treated with an aqueous 2 percent by weight slurry of Wyoming bentonite at the rate of 50 parts by weight of bentonite per million parts of water. To the resulting dispersion, the aqueous treating solution of acrylamide polymer of Example 2 was added at the rate of 0.5 part by weight of polymer per million parts of water. Satisfactory flocculation followed by good clarification by sedimentation was obtained.

*Example 5*

An aqueous 2 percent by weight slurry of Wyoming-type bentonite was mixed with turbid river water to provide a dosage of 50 parts by weight of bentonite per million parts of water. The mixing was accomplished with a rapidly operating propeller stirrer during a period of about one minute. To three equal portions of the bentonite-treated water, different acrylamide polymers in the form of aqueous solutions were added to provide 0.25 part by weight of polymer per million parts of water and a fourth equal portion was retained as a check. During the addition of the acrylamide polymers and for 20 minutes thereafter all four portions were stirred gently with paddle agitators equipped with 2.5 inch paddles rotating at 40 revolutions per minute. At the end of this period stirring was discontinued and the suspended solids were allowed to settle. After 2 minutes of settling time and again after 5 minutes, samples were withdrawn from each portion of water at depths of 2 inches below the surface. Turbidity readings were taken on the photo-electric colorimeter as in the preceding examples. The viscosities of the acrylamide polymers employed, their concentration in the treating solutions, and turbidity readings of the treated water are summarized in the following table.

| Viscosity of Acrylamide Polymer, Centipoises | Concentration of Polymer Treating Solution, Percent by Weight | Turbidity Reading After— | |
|---|---|---|---|
| | | 2 minutes | 5 minutes |
| Untreated Check | | 88 | 88 |
| 9.8 | 0.04 | 12 | 10 |
| 98.9 | 0.05 | 10 | 9.5 |
| 119 | 0.04 | 10 | 9.5 |

We claim:

1. A method for facilitating the reduction of turbidity in water which comprises the steps of dispersing in the water a slurry of bentonite in the amount of from about 10 to 500 parts by weight of bentonite per million parts by weight of water and adding to the resulting dispersion an acrylamide polymer in the amount of from about 0.05 to 2 parts by weight per million parts by weight of water.

2. A method according to claim 1 wherein the acrylamide polymer is characterized by a viscosity of at least about 2 centipoises for an aqueous 0.5 percent by weight solution thereof in water adjusted to a pH of 3 to 3.5 and a temperature of 25° C., as determined with an Ostwald viscosimeter.

3. A method according to claim 1 wherein the acrylamide polymer is added in the form of an aqueous solution containing from about 0.01 to about 0.1 percent by weight of the polymer.

4. A method according to claim 1 wherein the procedure is carried out with water containing metallic ions in amount equivalent to at least about 100 parts by weight of hardness, calculated as calcium carbonate, per million parts by weight of water.

5. In a method for facilitating the reduction of turbidity in water which includes the steps of dispersing a bentonite slurry in the water under conditions of vigorous agitation and thereafter maintaining the resulting dispersion under conditions of gentle agitation, the improvement which comprises admixing with said dispersion a dilute aqueous solution of an acrylamide polymer to accomplish the formation of readily settleable flocs, the polymer being employed in the amount from about 0.05 to 2 parts by weight and the bentonite in the amount of from about 10 to about 500 parts by weight per million parts of water.

References Cited in the file of this patent

UNITED STATES PATENTS

| | | |
|---|---|---|
| 1,170,868 | Bachler | Feb. 8, 1916 |
| 1,755,379 | Banks | Apr. 22, 1930 |
| 1,819,462 | Grossman | Aug. 18, 1931 |
| 1,847,212 | Feldenheimer | Mar. 1, 1932 |
| 2,043,713 | Saywell | June 9, 1936 |
| 2,261,918 | Pittman et al. | Nov. 4, 1941 |
| 2,281,759 | Gelder | May 5, 1942 |
| 2,284,827 | Lindsay et al. | June 2, 1942 |
| 2,345,827 | Olin | Nov. 7, 1944 |
| 2,346,320 | Moran et al. | Apr. 11, 1944 |
| 2,393,269 | Rudolfs et al. | Jan. 22, 1946 |
| 2,420,340 | Ryzner | May 13, 1947 |
| 2,668,111 | Lindquist | Feb. 2, 1954 |
| 2,728,725 | Gloor | Dec. 27, 1955 |
| 2,831,841 | Jones | Apr. 22, 1958 |
| 2,937,143 | Goren | May 17, 1960 |

FOREIGN PATENTS

| | | |
|---|---|---|
| 25,119 of 1894 | Great Britain | Oct. 5, 1895 |
| 154,799 | Australia | Jan. 19, 1954 |

OTHER REFERENCES

Schweitzer: "Rubber Chemistry and Technology," vol. 13, 1940, pp. 408–414. (Copy in Patent Office Library.)